US009511481B2

(12) United States Patent
Zajac, Jr. et al.

(10) Patent No.: US 9,511,481 B2
(45) Date of Patent: Dec. 6, 2016

(54) PIN CLAMP HAVING INTEGRATED CHECK VALVE

(71) Applicant: Zaytran, Inc., Elyria, OH (US)

(72) Inventors: Theodore Stanley Zajac, Jr., Avon Lake, OH (US); Steven Eric Wallace, Sheffield Lake, OH (US)

(73) Assignee: ZAYTRAN, INC., Elyria, OH (US)

( * ) Notice: Subject to any disclaimer, the term of this patent is extended or adjusted under 35 U.S.C. 154(b) by 0 days.

(21) Appl. No.: 14/509,833

(22) Filed: Oct. 8, 2014

(65) Prior Publication Data

US 2015/0097326 A1 Apr. 9, 2015

Related U.S. Application Data

(60) Provisional application No. 61/888,084, filed on Oct. 8, 2013.

(51) Int. Cl.

| | |
|---|---|
| ***B23Q 3/08*** | (2006.01) |
| ***B25B 5/16*** | (2006.01) |
| ***B25B 5/06*** | (2006.01) |

(52) U.S. Cl.
CPC ................. *B25B 5/16* (2013.01); *B25B 5/062* (2013.01); *Y10T 403/32861* (2015.01)

(58) Field of Classification Search
USPC ........................................................... 269/25
See application file for complete search history.

(56) References Cited

U.S. PATENT DOCUMENTS

| | | | | |
|---|---|---|---|---|
| 2,623,399 | A | 12/1952 | Barrett | |
| 3,180,236 | A * | 4/1965 | Beckett | F15B 15/1414 277/438 |
| 4,068,960 | A | 1/1978 | Swager | |
| 4,102,124 | A | 7/1978 | Swager | |
| 4,145,874 | A | 3/1979 | Muller et al. | |
| 4,896,989 | A | 1/1990 | Swager | |
| 5,046,881 | A | 9/1991 | Swager | |

(Continued)

FOREIGN PATENT DOCUMENTS

IT CA 2436617 A1 * 3/2004 ............. B25B 5/122

OTHER PUBLICATIONS

U.S. Appl. No. 14/509,811, filed Oct. 8, 2014.

(Continued)

*Primary Examiner* — Alvin Grant
(74) *Attorney, Agent, or Firm* — Eschweiler & Associates, LLC

(57) ABSTRACT

A pin clamp has a housing with a bore. A piston is coupled to a shaft, where the piston is in sliding engagement with the bore. The housing has first and second ports on opposing sides of the piston. A clamping arm coupled to the shaft extends and retracts with respect to the locating pin. A check valve is in the housing, where the check valve selectively maintains a pneumatic pressure on one of the first and second axial sides of the piston when pneumatic pressure is removed from the respective first or second axial side of the piston. One or more passages are further defined within the housing, defining a pneumatic circuit coupling the first port, second port, check valve, and a volume associated the bore. The check valve can be a pilot-operated check valve that is configured to be selectively energized by an application of pneumatic pressure.

14 Claims, 9 Drawing Sheets

(56) References Cited

U.S. PATENT DOCUMENTS

| | | | | | |
|---|---|---|---|---|---|
| 5,190,334 | A * | 3/1993 | Sawdon | B25J 15/028 | 294/119.1 |
| 5,746,741 | A | 5/1998 | Kraus et al. | | |
| 5,761,985 | A * | 6/1998 | Stoll | F15B 15/1414 | 92/165 PR |
| 6,059,277 | A * | 5/2000 | Sawdon | B25B 5/16 | 269/24 |
| 6,105,947 | A | 8/2000 | Dykstra | | |
| 6,340,361 | B1 | 1/2002 | Kraus et al. | | |
| 6,435,469 | B1 | 8/2002 | Ratcliff et al. | | |
| 6,931,980 | B1 * | 8/2005 | Zajac. Jr. | F15B 15/222 | 269/32 |
| 6,931,982 | B1 * | 8/2005 | Zajac, Jr. | F15B 15/1414 | 92/165 PR |
| 7,182,326 | B2 * | 2/2007 | McIntosh | B25B 5/062 | 269/24 |
| 7,448,607 | B2 * | 11/2008 | Steele | B25B 5/087 | 269/24 |
| 7,516,948 | B2 * | 4/2009 | McIntosh | B25B 5/062 | 269/27 |
| 7,559,568 | B2 | 7/2009 | Planz | | |
| 7,815,176 | B2 * | 10/2010 | McIntosh | B25B 5/087 | 269/229 |
| 8,171,715 | B2 | 5/2012 | Segura | | |
| 8,376,336 | B2 * | 2/2013 | McIntosh | B23Q 16/001 | 269/24 |
| 8,413,970 | B2 * | 4/2013 | McIntosh | B25B 5/087 | 269/244 |
| 8,444,128 | B2 * | 5/2013 | Karras | B23Q 3/082 | 269/24 |
| 8,459,626 | B2 | 6/2013 | Sawdon et al. | | |
| 8,657,819 | B2 | 2/2014 | Muerner et al. | | |
| 8,746,664 | B2 * | 6/2014 | Rentz | B25B 5/122 | 269/20 |
| 8,918,968 | B2 * | 12/2014 | Rentz | 24/463 | |
| 2002/0063371 | A1 * | 5/2002 | Takahashi | B25B 5/087 | 269/32 |
| 2004/0041324 | A1 * | 3/2004 | Fukui | B25B 5/16 | 269/32 |
| 2011/0291341 | A1 * | 12/2011 | Sawdon | B25B 5/062 | 269/216 |
| 2013/0269516 | A1 | 10/2013 | Zajac, Jr. et al. | | |
| 2014/0103589 | A1 * | 4/2014 | McIntosh | B23Q 3/08 | 269/32 |

OTHER PUBLICATIONS

U.S. Appl. No. 14/509,770, filed Oct. 8, 2014.

Non-Final Office Action Dated Apr. 7, 2016 U.S. Appl. No. 14/509,811.

Notice of Allowance Dated Dec. 22, 2015 U.S. Appl. No. 14/509,770.

* cited by examiner

PIN CLAMP HAVING INTEGRATED CHECK VALVE

REFERENCE TO RELATED APPLICATION

This application claims priority to and the benefit of U.S. Provisional Application Ser. No. 61/888,084 which was filed Oct. 8, 2013, entitled "LOCKING PIN CLAMP", the entirety of which is hereby incorporated by reference as if fully set forth herein.

FIELD

The present disclosure relates generally to clamping devices, and more particularly to a pin clamp having a clamping arm mechanism configured to be positioned at four 90-degree opposed positions, as well as a locking mechanism having a pilot-operated check valve integrated into a body of the pin clamp and configured to selectively retain the clamping arm mechanism in a clamped position. The present disclosure further provides to a novel clevis assembly having an o-ring configured to retain a position of a clevis pin within the clevis.

BACKGROUND

Pneumatically operated clamps are used in a variety of industries for securing objects in a position for various purposes. In automobile manufacturing, for example, stamped metal body parts are assembled on a pallet, wherein various pre-fabricated individual initial components or other parts of an automobile body are positioned on the pallet and clamped in place. Once clamped, the individual initial components are welded together, therein generally defining the automobile body. A typical pallet has at least four clamping locations (e.g., one clamping location is assigned to each of four corners of the automobile body), wherein at least one pin clamp apparatus is precisely affixed to the pallet at each clamping location via a riser (e.g., a weldment having precise dimensions).

Accordingly, once clamped in place by the pin clamps, the precise positioning of the individual initial components of the automobile body is assured at an initial station along an assembly line, and subsequent positioning and welding of subsequent components to the automobile body can be further generally assured, assuming the pin clamp(s) retain their clamping force as the automobile body progresses along the assembly line. Once assembly of the automobile body is complete, the pin clamps release the automobile body from the pallet for subsequent assembly, such as for painting and final assembly.

Conventionally, the pallet is referenced at a hardened steel position on the pallet, and the risers (and associated pin clamps) are further referenced to the hardened steel position. Typically, the pin clamps are pneumatically operated, wherein initial clamping of the pin clamps is performed at the initial station by pneumatic pressure. In order to maintain the precise positioning of the automobile body along the assembly line, the pin clamps at the four corners must typically remain clamped until assembly of the automobile body (often referred to as a "white body") is finished. However, once the initial components are positioned and welded at the initial station, pneumatic pressure is removed from the pin clamps so that the pallet can be transferred to subsequent welding and assembly stations. Pneumatic pressure is typically not reintroduced to the pin clamps until the white body is completely assembled, which is when the white body is unclamped from the pallet and ready for the subsequent assembly process. Conventionally, the white body is held in place by the clamping pins during the absence of pneumatic pressure via complex mechanical components within the clamping pin apparatus, such as cams, gears, or other mechanisms.

During initial setup and/or day-to-day operation in the assembly process, it is also sometimes necessary to modify an orientation of the pin clamps for various reasons, such as to permit access for robots to enter areas of the automobile body otherwise blocked by a pin clamp. Conventionally, a pin clamp is configured to be initially secured to the riser, whereby the orientation and referencing of the pin clamp with respect to the hardened steel position on the pallet is accurately measured. Conventional pin clamps have been provided that can clamp a workpiece with respect to a mounting surface of the pin clamp, or in a position that is 180-degrees opposed to the initial position. As such, when clamping is desired at positions other than the initial or 180-degree opposed position of the pin clamp, the riser is typically modified or changed, and the pallet is referenced again, at significant cost and consumption of time. Such a change can cause many problems, especially when a large number of pallets are involved (e.g., 800-1000 pallets are not uncommon in an assembly line). Furthermore, customized risers can be quite expensive, where the customized riser is designed to provide specialized location capabilities.

SUMMARY

The present disclosure provides a novel pin clamp, wherein an orientation of a clamping member is configured to be readily adjustable in one of four 90-degree opposed positions. Further, a novel clevis assembly is provided, wherein a clevis pin associated therewith is secured via an o-ring, and wherein the clevis pin is easily removable. Still further, the present disclosure provides a novel locking pin clamp, wherein a pilot-operated check valve selectively maintains a clamping force applied to an object until specifically released. Accordingly, the following presents a simplified summary of the disclosure in order to provide a basic understanding of some aspects of the disclosure. This summary is not an extensive overview of the disclosure. It is intended to neither identify key or critical elements of the invention nor delineate the scope of the invention. Its purpose is to present some concepts of the invention in a simplified form as a prelude to the more detailed description that is presented later.

In accordance with one exemplary aspect, a pin clamp is disclosed, wherein the pin clamp comprises a housing having a bore extending therethrough, therein defining an axis. The housing comprises first and second actuator holes defined therethrough, wherein the first and second actuator holes extend radially with respect to the axis and are opposed to one another by 90 degrees. A shaft is in sliding engagement with at least a first portion of the bore, wherein the shaft comprises a radial shaft hole associated with a distal end thereof. Further, a piston is operably coupled to the shaft, wherein the piston is in sliding engagement with a second portion of the bore.

According to one example, a clevis is provided having a clevis base and two clevis prongs extending from the clevis base generally parallel to the axis. Each clevis prong comprises a radial prong hole extending therethrough generally perpendicular to the axis. The clevis base, for example, comprises an axial hole along the axis and first and second radial clevis holes generally perpendicular to the axis, wherein the first and second radial clevis holes are opposed to one another by 90-degrees. The axial hole, for example, is configured to accept the distal end of the shaft. The clevis base is further configured to couple the clevis to the shaft in each of four 90-degree-opposed positions with respect to the shaft and housing via a selective engagement of a clevis fastener passing through one of the first and second radial clevis holes in the clevis base and the radial shaft hole in the shaft.

A locating pin is further provided having an internal cavity extending axially from a mounting portion thereof and radially through an opening in a sidewall of the locating pin. The mounting portion of the locating pin is configured to be selectively coupled to the housing in one of the four 90-degree-opposed positions with respect to the shaft and housing.

A clamping arm is also provided, wherein the clamping arm has a tang end and an engagement end. A slot is defined between the tang end and engagement end, therein defining a cam surface. The tang end further comprises a tang hole therethrough.

An actuator pin is selectively coupled to the housing and extends radially through one of the first and second actuator holes based on an orientation of the clamping arm with respect to the housing. The actuator pin further extends through the slot in the clamping arm, therein defining a cam follower.

A clevis pin is configured to selectively couple the tang end of the clamping arm to the clevis, wherein the clevis prongs sandwich the clamping arm therebetween. The clevis pin passes through the tang hole in the clamping arm and selectively engages the radial prong hole of the clevis prongs, therein providing a pivot for the clamping arm. The actuator pin further extends through the slot in the clamping arm, therein providing a rotational engagement of the clamping arm with respect to the clevis and a sliding engagement between the slot in the clamping arm and the actuator pin. The engagement end of the clamping arm, for example, is configured to extend and retract through the opening in the sidewall of the locating pin based on an axial position of the shaft with respect to the housing.

In accordance with another exemplary aspect, a check valve is associated with the housing, wherein the check valve is configured to selectively maintain a pneumatic pressure associated with one of a first axial side and a second axial side of the piston when a source of pneumatic pressure is removed from the one of the first axial side and second axial side of the piston.

DETAILED DESCRIPTION

Figure 1A:
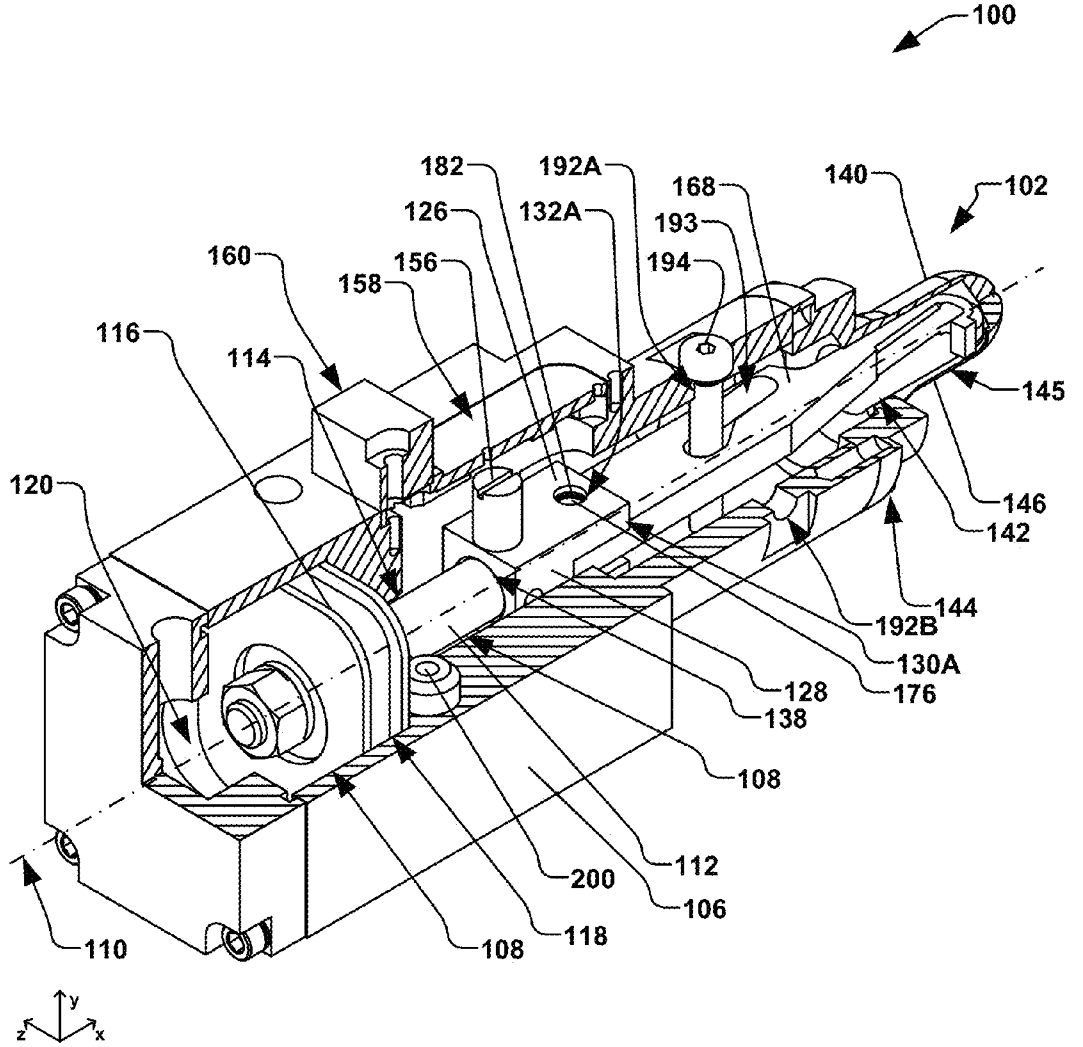
FIGS. 1A-1B are perspective views of an exemplary pin clamp in a respective unclamped and clamped position in accordance with several aspects of the present disclosure.

The present disclosure will now be described with reference to the drawings wherein like reference numerals are used to refer to like elements throughout. It is to be understood that the description of these aspects are merely illustrative and that they should not be interpreted in a limiting sense. In the following description, for purposes of explanation, numerous specific details are set forth in order to provide a thorough understanding of the present invention. It will be evident to one skilled in the art, however, that the present invention may be practiced without these specific details. Further, the scope of the invention is not intended to be limited by the embodiments or examples described hereinafter with reference to the accompanying drawings, but is intended to be only limited by the appended claims and equivalents thereof.

It is also noted that the drawings are provided to give an illustration of some aspects of embodiments of the present disclosure and therefore are to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative locations of the various components in implementations according to an embodiment of the invention. Furthermore, the features of the various embodiments and examples described herein may be combined with each other unless specifically noted otherwise.

It is also to be understood that in the following description, any direct connection or coupling between functional blocks, devices, components, circuit elements or other physical or functional units shown in the drawings or described herein could also be implemented by an indirect connection or coupling. Furthermore, it is to be appreciated that functional blocks or units shown in the drawings may be implemented as separate features or circuits in one embodiment, and may also or alternatively be fully or partially implemented in a common feature or circuit in another embodiment.

Figure 1B:
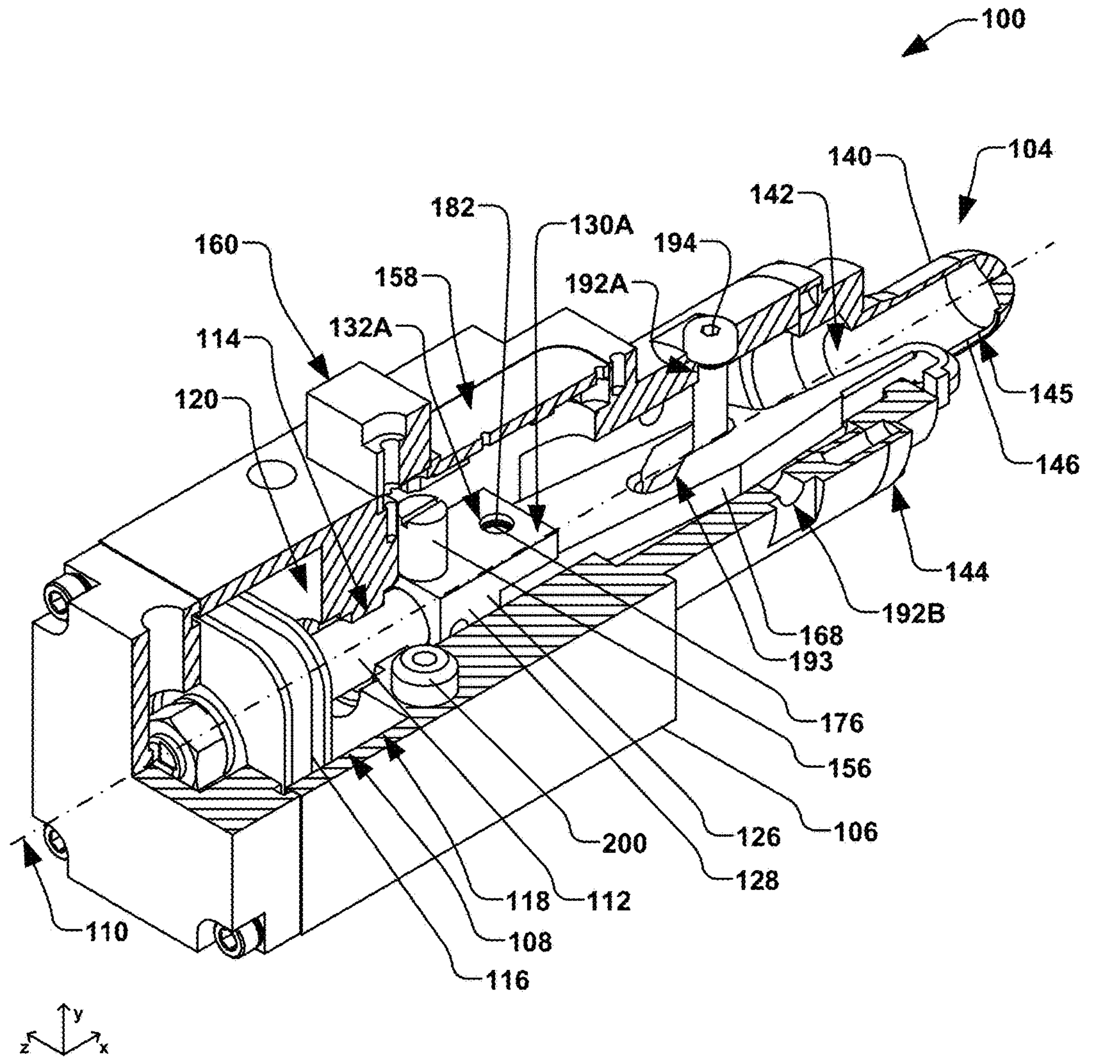

The present disclosure will now be described in more detail with general reference to the accompanying figures. In accordance with one aspect of the present disclosure, FIG. 1A illustrates an exemplary pin clamp 100 in an unclamped position 102, while FIG. 1B illustrates the pin clamp in a clamped position 104. It should be noted that the pin clamp 100 is illustrated as an example, and various other clamping apparatuses and configurations may utilize one or more features provided in the present disclosure. Accordingly, the pin clamp 100 of FIGS. 1A-1B is configured to selectively clamp a workpiece (not shown), such as an automobile body component, thereto. The pin clamp 100, for example, comprises a housing 106 having a bore 108 extending therethrough. The bore 108 generally defines an axis 110, wherein a shaft 112 is in sliding engagement with at least a first portion 114 of the bore. A piston 116, for example, is further coupled to the shaft 112, wherein the piston is in sliding engagement with a second portion 118 of the bore 108, thereby defining a volume 120 within the second portion 118 of the bore 108, wherein the volume is variable based on a position of the piston along the axis 110. It should be noted that the piston 116 and second portion 118 of the bore 108 are not limited to a particular shape or cross-section. In the present example, the piston 116 and second portion 118 of the bore 108 have a cross-section that is rectangular with substantially rounded corners and may be similar to that provided in co-owned U.S. patent application Ser. No. 13/447,411, entitled COMPACT LINEAR ACTUATOR WITH ANTI-ROTATION DEVICE, the entirety of which is hereby incorporated by reference as if fully set forth herein.

Figure 2A:
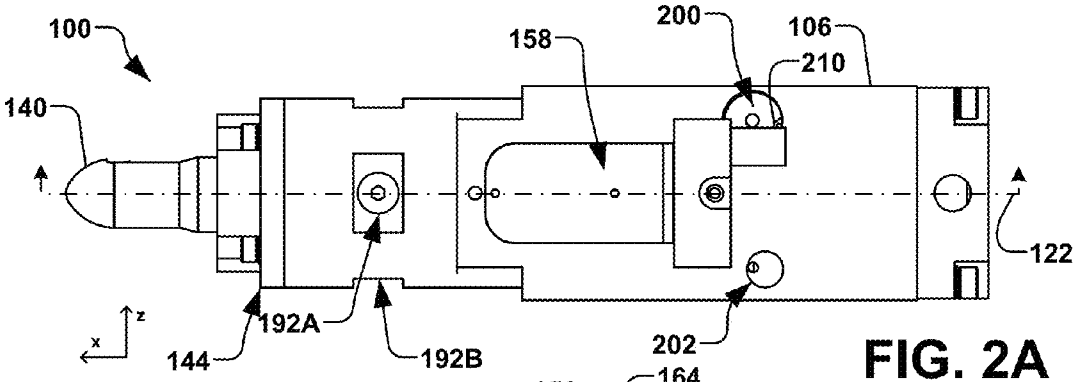
FIG. 2A illustrates an exemplary plan view of the pin clamp of FIGS. 1A-1B in accordance with another aspect.
Figure 2B:
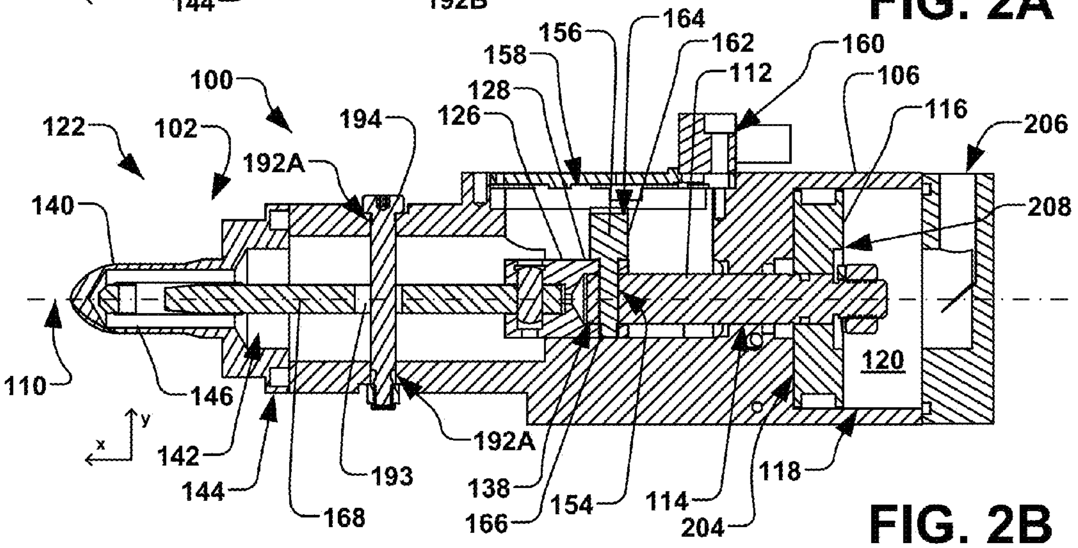
FIGS. 2B-2C are cross-sectional views of the pin clamp of FIG. 2A in respective unclamped and clamped positions in accordance with another aspect.
Figure 2C:
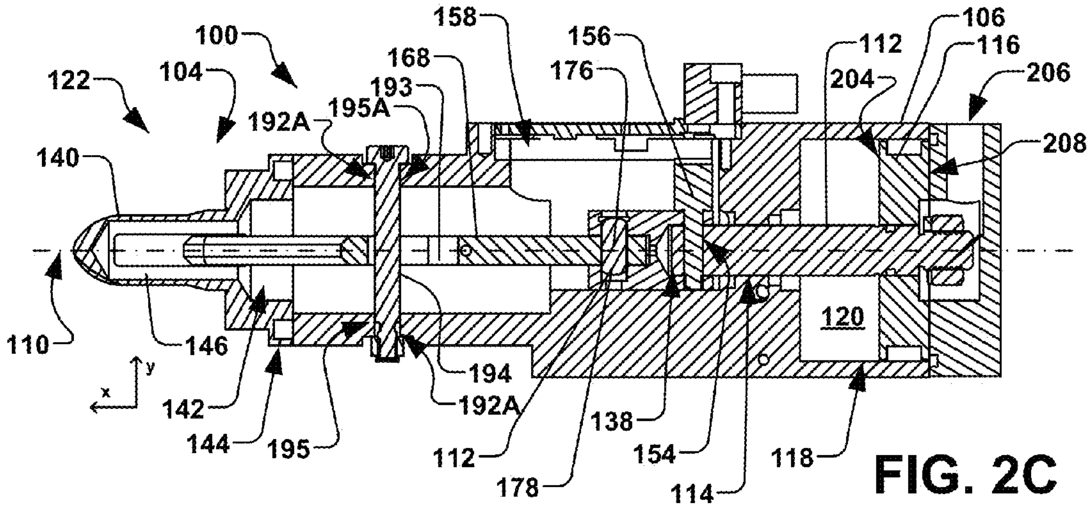
Figure 3A:
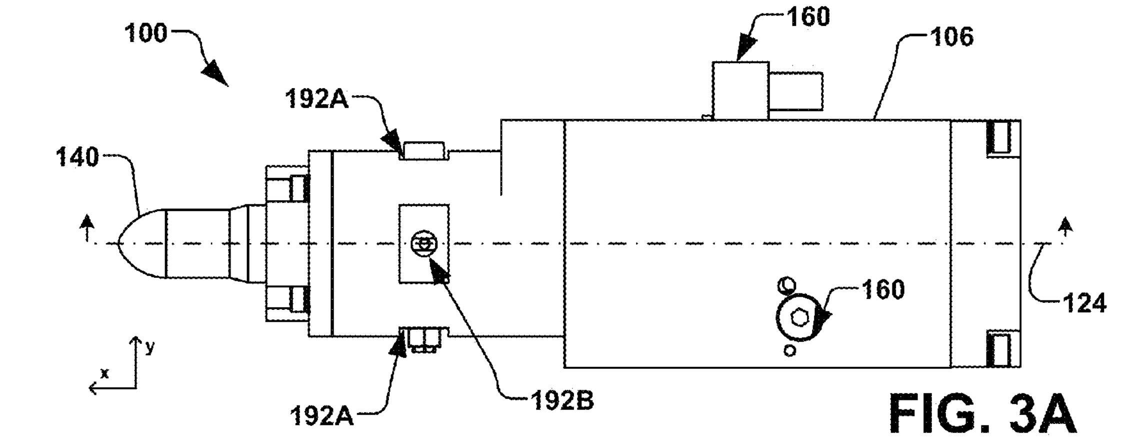
FIG. 3A illustrates a side view of the pin clamp of FIGS. 1A-1B in accordance with another aspect.
Figure 3B:
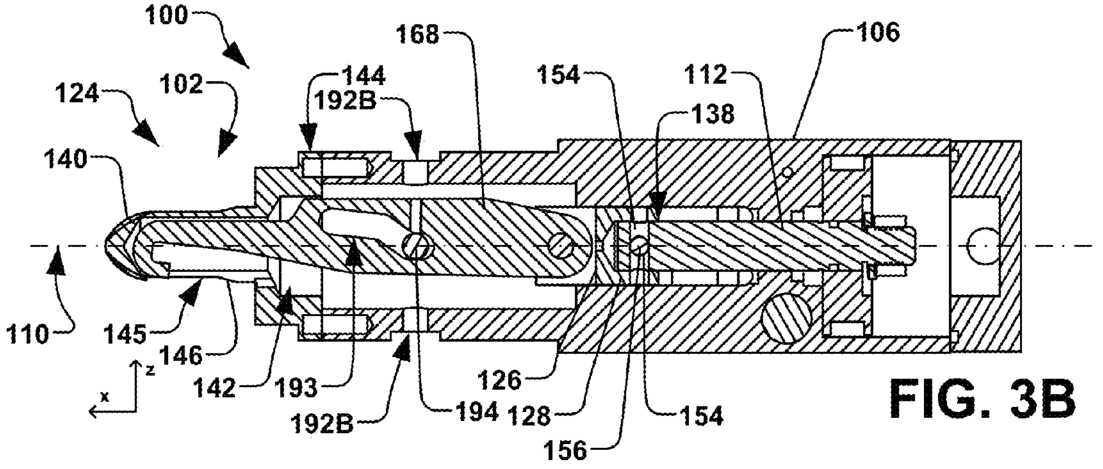
FIGS. 3B-3C are cross-sectional views of the pin clamp of FIG. 3A in respective unclamped and clamped positions in accordance with another aspect.
Figure 3C:
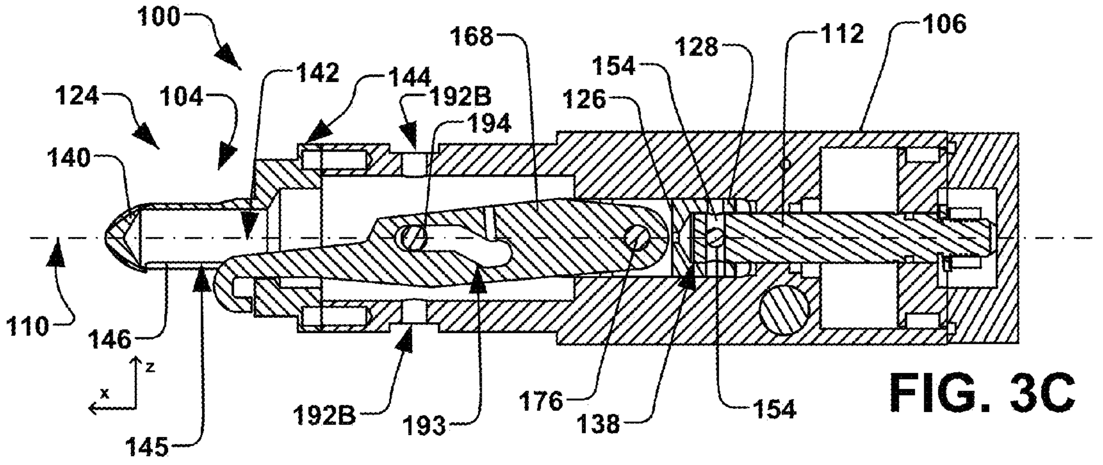

For purposes of clarity, FIGS. 2A-2C and 3A-3C illustrate various views of the pin clamp 100 of FIGS. 1A-1B. FIGS. 2B and 2C, for example, illustrate a cross-section 122 of the pin clamp 100 of FIG. 2A in respective the unclamped position 102 and clamped position 104. Likewise, FIGS. 3B and 3C illustrate another cross-section 124 of the pin clamp 100 of FIG. 3A in the respective unclamped position 102 and clamped position 104. In the following description, various features illustrated in FIGS. 1A-1B, 2B-2C, and 3B-3C may be referred to generally, wherein the various features may be illustrated in greater or lesser detail in the various views.

Figure 4A:
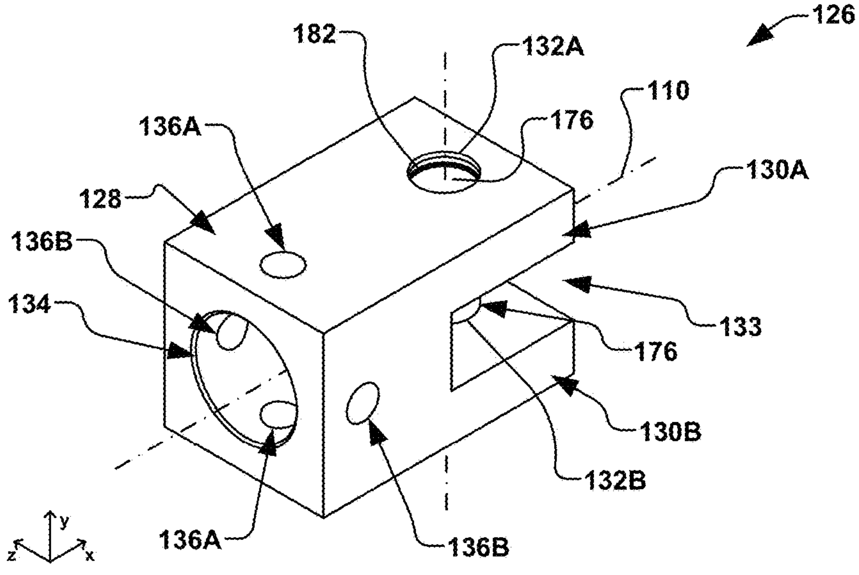
FIG. 4A is a perspective view of an exemplary clevis assembly in accordance with another exemplary aspect of the disclosure.

According to one example, the pin clamp 100 of the present disclosure comprises a clevis 126, wherein the clevis is operably coupled to the shaft 112. The clevis 126, for example, comprises a clevis base 128 and two clevis prongs 130A, 130B extending from the clevis base generally parallel to the axis 110. The clevis 126, for example, is illustrated in greater detail in FIGS. 4A-4C, wherein each clevis prong 130A, 130B comprises a respective radial prong hole 132A, 132B extending therethrough, and wherein each radial prong hole is generally perpendicular to the axis 110, therein defining a gap 133 therebetween. In the present example, the clevis base 128 comprises an axial hole 134 positioned along the axis 110, as well as a first radial clevis hole 136A and a second radial clevis hole 136B positioned generally perpendicular to the axis. In accordance with the present example, the first radial clevis hole 136A and second radial clevis hole 136B are opposed to one another by 90-degrees, as illustrated in FIG. 4A. Accordingly, in the present example, the axial hole 134 of the clevis 126 is configured to accept a distal end 138 of the shaft 112 of FIGS. 1A-1B, 2B-2C and 3B-3C.

Figure 7:
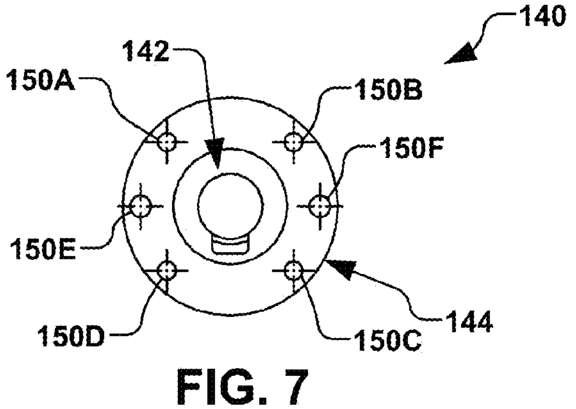
FIG. 7 illustrates an exemplary locating pin in accordance with still another aspect of the disclosure.

A locating pin 140 is further provided, wherein the locating pin comprises an internal cavity 142 extending axially from a mounting portion 144 thereof and radially through an opening 145 in a sidewall 146 of the locating pin. The mounting portion 144 of the locating pin 140, for example, is configured to be selectively coupled to the housing 106 in one of the four 90-degree-opposed positions 148A-148D with respect to the shaft 112 and housing 106, as illustrated in FIGS. 5A-5D and 6A-6D (e.g., the housing 106 is illustrated in the same position in FIGS. 5A-5D and 6A-6D). In one example, as illustrated in FIG. 7, the mounting portion 144 of the locating pin 140 comprises a plurality of locating pin mounting holes 150A-150F configured to align with a respective plurality of housing mounting holes (not shown) defined in the housing 106 of FIGS. 6A-6D. For example, the plurality of locating pin mounting holes 150A-150F are generally symmetrical with one another. Accordingly, a respective plurality of mounting fasteners 152A-152F illustrated in FIGS. 6A-6D are configured to selectively couple the locating pin 140 to the housing 106 in association with each of the four 90-degree-opposed positions 148A-148D via a selective engagement of the plurality of mounting fasteners with the respective plurality of locating pin mounting holes 150A-150F and plurality of housing mounting holes (not shown).

The plurality of mounting fasteners 152A-152F, for example, may comprise one or more of a screw, bolt, stud, dowel, and pin. In the present example, the housing 106 comprises eight housing mounting holes, four of which are threaded and configured to align with mounting fasteners 152A-152F of FIGS. 6A-6B, and the remaining four of which are blind holes and configured to align with mounting fasteners 152E-152F. As such, mounting fasteners 152A-152D comprise threaded fasteners such as screws or bolts, while mounting fasteners 152E-152F comprise a non-threaded stud, dowel, or pin. The number, orientation, and selection of the locating pin mounting holes 150A-150F, mounting fasteners 152E-152F, housing mounting holes, and mounting fasteners 152E-152F can vary based on the desired position of the locating pin 140 with respect to the housing 106, and numerous variations are contemplated as falling within the scope of the present disclosure.

Referring again to FIGS. 2B-2C and FIGS. 3B-3C, in another example of the present disclosure, the shaft 112 further comprises a radial shaft hole 154 associated with the distal end 138 thereof. In the present example, two radial shaft holes 154 are illustrated 90-degrees opposed to one another. Accordingly, the clevis base 128 is configured to couple the clevis 126 to the shaft 112 to provide each of the four 90-degree-opposed positions 148A-148D with respect to the housing 106 or shaft, as illustrated in FIGS. 5A-5D and 6A-6D, as will be further appreciated infra. In one example, a clevis fastener 156 is provided, wherein the clevis fastener selectively engages and/or passes through one of the first and second radial clevis holes 136A, 136B in the clevis base of FIG. 4A and the radial shaft hole 154 of the shaft 112.

In one particular example, the housing 106 comprises an axial channel 158 defined therein, as illustrated in FIGS. 1A-1B and 2A-2C wherein the axial channel provides access to the clevis fastener 156, and wherein the clevis base 128 is selectively removable from the shaft 112 via a removal of the clevis fastener through the axial channel in the housing. According to another example, a position sensor 160 is further operably coupled to the housing 106, wherein the position sensor is configured to sense a position of one or more components associated with the shaft 112 with respect to the housing, such as a position of the clevis fastener 156 along the axis 110. For example, the clevis fastener 156 may comprise a screw 162 having an enlarged head 164, as illustrated in FIG. 2B. Accordingly, each of the first and second radial clevis holes 136A, 136B may comprise a threaded portion 166 (also shown in FIGS. 4B-4C), wherein the screw 162 is configured to thread into the threaded portion of the first and second radial clevis holes in the clevis base 128. Thus, in one example, the position sensor 160 of FIG. 2B is configured to sense the position of the enlarged head 164 of the screw 162 along the axis 110, therein indicating whether the pin clamp 100 is in the unclamped position 102 of FIG. 1A or clamped position 104 of FIG. 1B.

Figure 8:
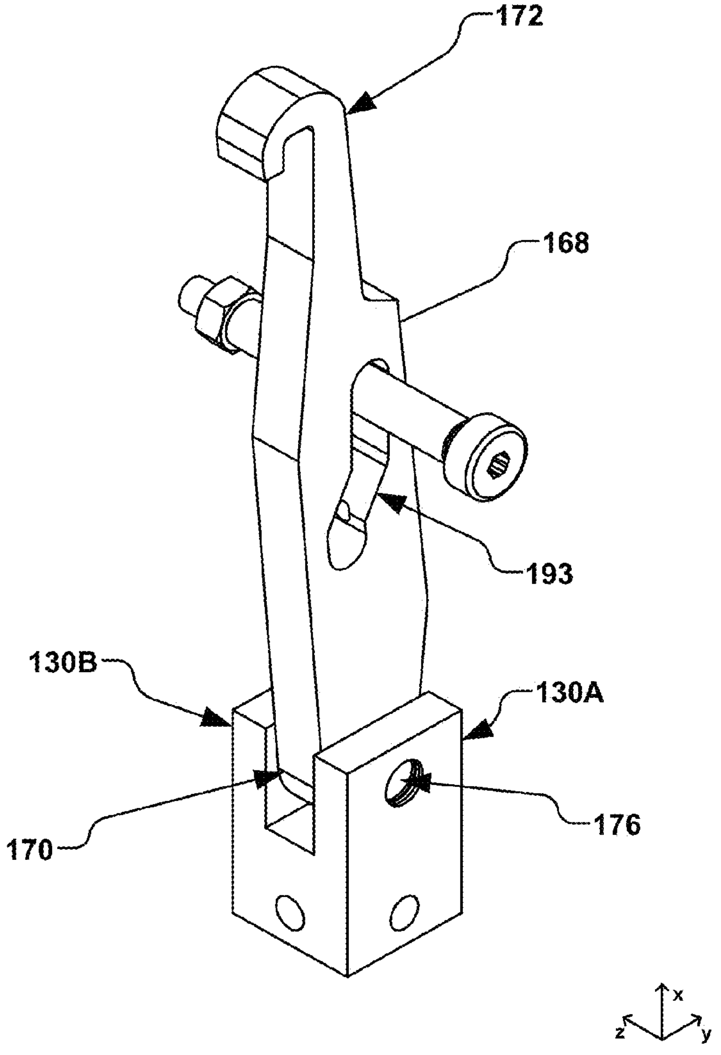
FIG. 8 illustrates an exemplary clamping arm and clevis assembly in accordance with another aspect of the disclosure.
Figure 9A:
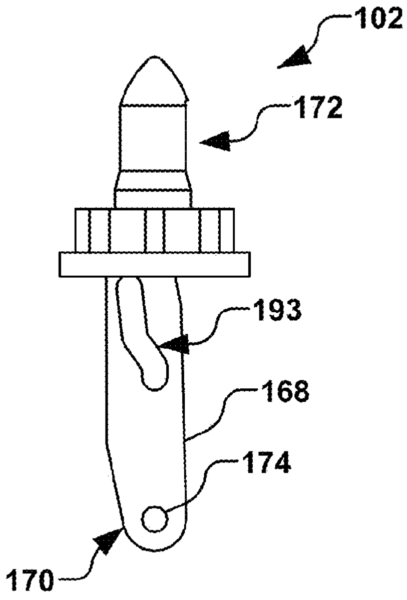
FIGS. 9A-9B illustrate an exemplary clamping arm and locating pin in respective unclamped and clamped positions in accordance with a further aspect of the disclosure.
Figure 9B:
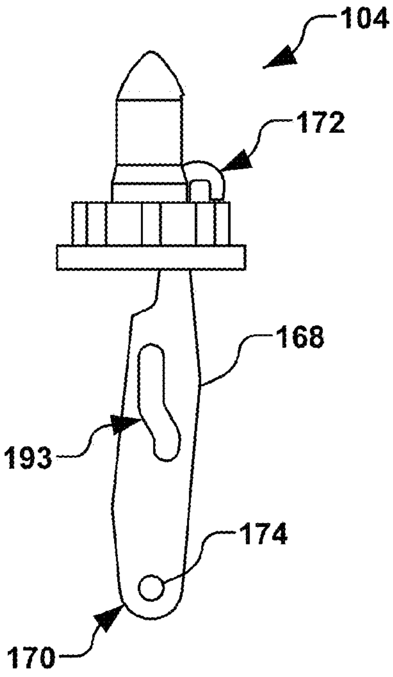

According to another example, a clamping arm 168 is further provided in FIGS. 1A-1B, 2B-2C, and 3B-3C. The clamping arm 168 is further illustrated in FIG. 8, wherein the clamping arm comprises a tang end 170 and an engagement end 172. The engagement end 172, for example, is configured to selectively clamp a workpiece (not shown) to the housing 106 or locating pin 140 of FIGS. 1A-1B. The tang end 170 comprises a tang hole 174 (e.g., illustrated in FIGS. 9A-9B) therethrough, wherein a clevis pin 176 illustrated in FIG. 2C, for example, is configured to selectively couple the tang end of the clamping arm 168 to the clevis 126. For example, the clevis prongs 130A, 130B of FIG. 8 sandwich the clamping arm 168 therebetween, whereby the clevis pin 176 passes through the tang hole 174 in the clamping arm and selectively engages the radial prong hole 132A, 132B of the respective clevis prongs. Thus, a pivot for the clamping arm 168 is provided by the clevis pin 176.

Figure 4B:
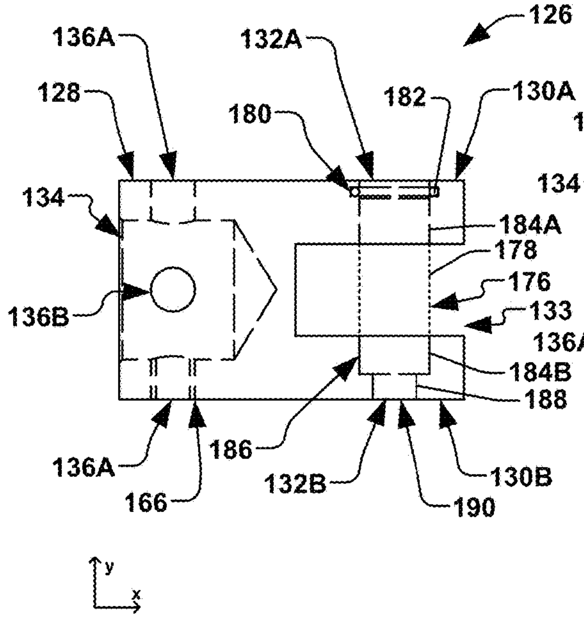
FIGS. 4B-4C are respective plan and side views of the exemplary clevis assembly of FIG. 4A according to yet another aspect.
Figure 4C:
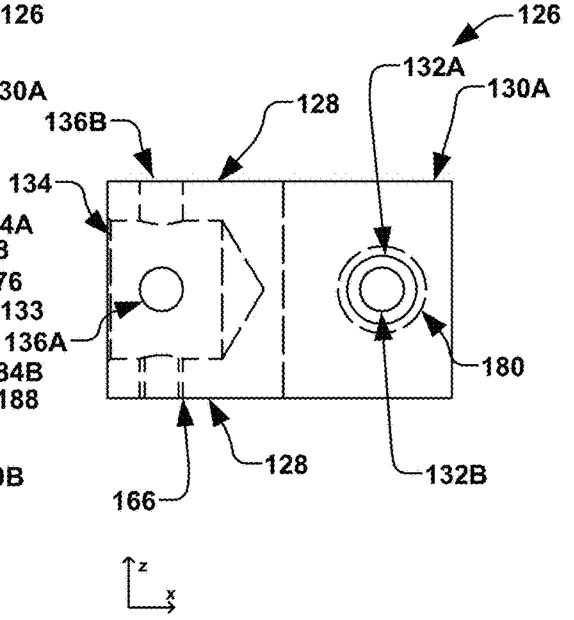
Figures 5A, 5B, 5C, 5D, 6A, 6B, 6C, 6D:
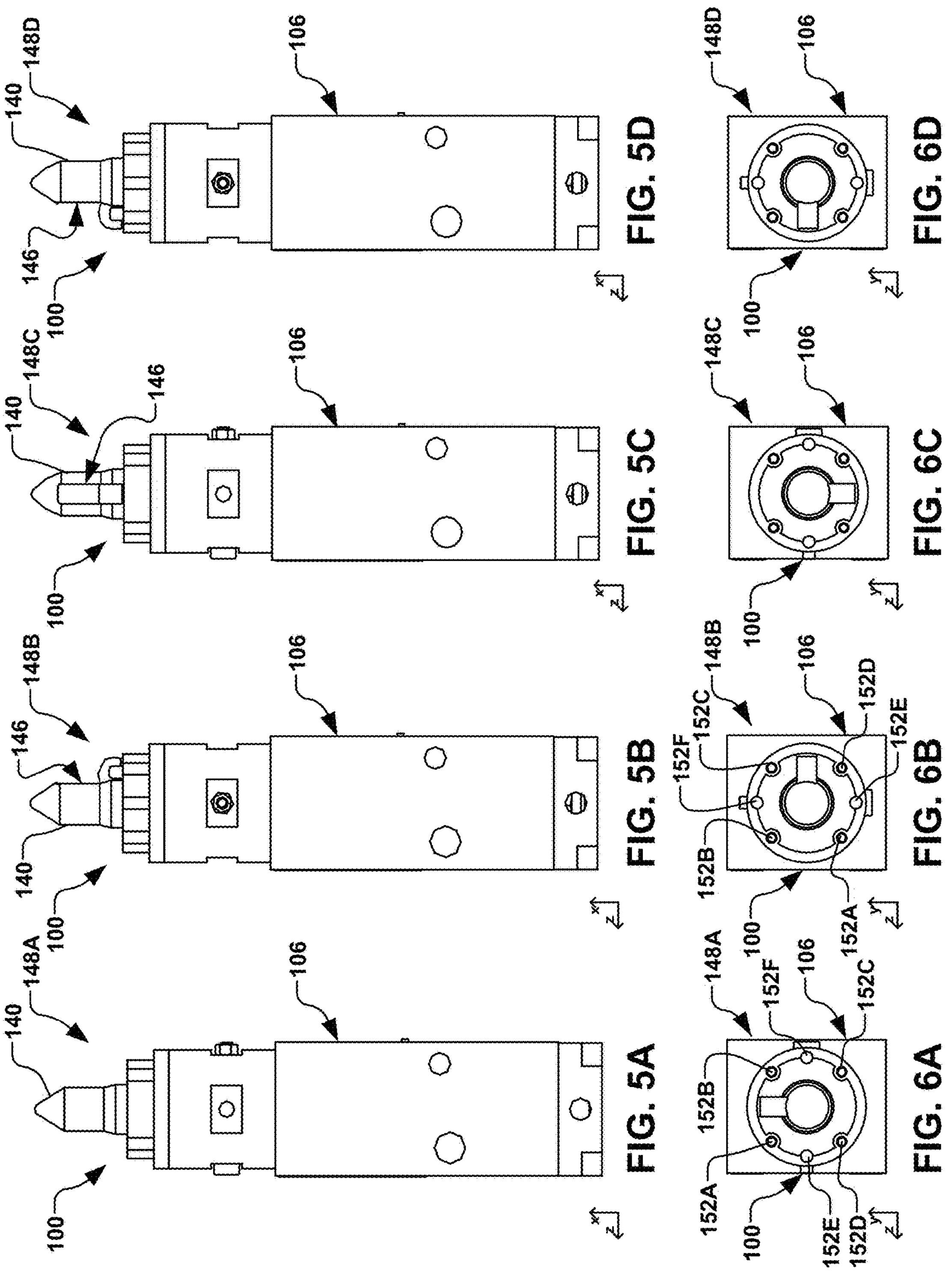
FIGS. 5A-5D illustrate an exemplary pin clamp in respective 90-degree offset positions, in accordance with still another aspect.
FIGS. 6A-6D illustrate end views an exemplary pin clamp in respective 90-degree offset positions corresponding to FIGS. 5A-5D, respectively, in accordance with still another aspect of the disclosure.

In accordance with another exemplary aspect of the present disclosure, the clevis pin 176 comprises a pin or dowel 178, as illustrated in FIGS. 2C and 4B, wherein the clevis pin comprises no threads. For example, the pin or dowel 178 (shown in phantom in FIG. 4B) is generally cylindrical and comprises a smooth surface about a circumference thereof. One or more of the clevis 126 and dowel 178, for example, may be comprised of a hardened metal, such as hardened steel. Alternatively, a coating may be provided on one or more of the clevis 126 and dowel 178 to limit wear.

Accordingly, the clevis pin 176 is engaged with, but is not fixedly coupled to the radial prong holes 132A, 132B. In one example, at least one of the two clevis prongs 130A, 130B comprises an internal o-ring groove 180 defined in the radial prong hole 132A, 132B of the respective clevis prong, wherein an o-ring 182 is positioned within the o-ring groove. The o-ring 182, for example, comprises an inner diameter (ID) that is sized such that the o-ring selectively maintains a position of the pin or dowel 178 within the radial prong holes 132A, 132B up to a predetermined axial force. In other words, an application of axial force to the clevis pin 176, for example, will not translate the clevis pin outside of the respective radial prong hole 132A, 132B until the predetermined axial force (also called a first predetermined retention force) is exceeded. The predetermined axial force may be associated with a manual pressure exerted by a maintenance worker, such as approximately 25 lbs. of force. Thus, the o-ring 182 generally retains the dowel within the radial prong holes 132A, 132B of the two clevis prongs 130A, 130B, unless the predetermined axial force is exceeded.

In one example, as illustrated in FIG. 4B, the radial prong holes 132A, 132B respectively define a first through hole 184A and a second through hole 184B, wherein the dowel 178 has a length configured to be selectively concurrently positioned within both the first through hole and second through hole, and wherein the dowel generally spans the gap 133 between the two clevis prongs 130A, 130B. Respective diameters of the dowel 178, first through hole 184A, and second through hole 184B are sized to produce a slip fit of the dowel within the first through hole and at least a portion 186 of the second through hole.

In one example, the diameters of the first and second through holes 184A, 184B are generally equal and uniform throughout the radial prong holes 132A, 132B. In another example, the diameter of first through hole 184A is uniform, while the second through hole 184B comprises a step 188 in the diameter distal to the gap 133, wherein the step reduces the diameter to a diameter that is smaller than the diameter of the dowel 178, therein preventing or otherwise limiting an axial translation of the dowel through an end 190 of the second hole 184B. The step 188, for example, permits a force to be applied to the dowel 178 via a removal tool (not shown), wherein a diameter of the removal tool is smaller than the diameter of the step, and wherein the removal tool is configured to withstand the predetermined axial force associated with pressing the dowel out of the radial prong holes 132A, 132B.

In another example, the second through hole 184B comprises an internal o-ring groove 180 defined therein similar to that of the first through hole 184A, wherein respective internal o-ring grooves having respective o-rings 182 positioned therewithin. Thus, the dowel 178 may be retained simply by the o-rings, wherein the predetermined axial force limits the axial translation of the dowel 178 through either of the first and second through holes 184A, 184B. The o-ring 182 discussed above may be comprised of any generally compliant material, such as rubber, buna-N, Viton, or any other generally resilient material, whereby the predetermined axial force is based on the ID of the o-ring and the resilience of the material.

According to yet another example, the dowel 178 may comprise an external circumferential o-ring groove (not shown), wherein an o-ring 182 is positioned within the external circumferential o-ring groove of the dowel, and wherein the o-ring generally retains the dowel within the radial prong holes 132A, 132B in a manner similar to that discussed above.

In accordance with yet another exemplary aspect of the disclosure, the housing 106 of the pin clamp 100 of FIGS. 1A-1B, 2A-2C, and 3A-3C further comprises first and second actuator holes 192A, 192B, wherein the first and second actuator holes extend radially with respect to the axis 110 and are opposed to one another by 90 degrees. In one example, at least one of the first and second actuator holes 192A, 192B and one of the first and second radial clevis holes 136A, 136B of the clevis 126 are radially aligned with one another. As illustrated FIGS. 1A-1B, 2B-2C, and 3B-3C, a slot 193 is defined in the clamping arm 168, wherein the slot is arranged between the tang end 170 and engagement end 172 of the clamping arm, as further illustrated in FIGS. 8 and 9A-9B, therein defining a cam surface. An actuator pin 194 illustrated in FIGS. 1A-1B, 2B-2C, 3B-3C, for example, is thus selectively coupled to the housing 106 and extends radially through one of the first and second actuator holes 192A, 192B and the slot 193 based on an orientation of the clamping arm 168 with respect to the housing 106.

The actuator pin 194 thus defines a cam follower for the clamping arm 168, whereby a linear movement of the tang end 170 of clamping arm along the axis 110 causes a predetermined rotation of the engagement end 172 about the clevis pin 176, thus selectively clamping and unclamping the workpiece. Thus, the rotational engagement of the clamping arm 168 with respect to the clevis 126 and sliding engagement between the slot 193 and the actuator pin 194 allows the engagement end 172 of the clamping arm to extend and retract through the opening 145 in the sidewall 146 of the locating pin 140 based on an axial position of the shaft 112 with respect to the housing 106.

Each of the first and second actuator holes 192A, 192B, for example, may comprise a through hole 195, as illustrated in FIG. 2C, wherein the actuator pin 194 comprises a screw or bolt having a head and a threaded portion, wherein the actuator pin extends through the through holes, and wherein a nut selectively threads onto the threaded portion of the actuator pin, therein selectively securing the actuator pin to the housing. Alternatively, the first and second actuator holes 192A, 192B each comprise a respective through hole 195 and a threaded hole (not shown), wherein the actuator pin 194 comprises a threaded portion and extends through the through hole and threads into the threaded hole in the housing 106, therein selectively securing the actuator pin to the housing.

In another aspect of the disclosure, the pin clamp 100 provided herein is configured to maintain a predetermined clamping force on a workpiece (e.g., an automobile white body) when pneumatic pressure to the pin clamp is removed. The pin clamp 100 of FIGS. 1A-1B, for example, comprises a pilot-operated check valve 200 that is integrated into the housing 106 the pin clamp. As such, the pilot-operated check valve 200 is embedded in the pin clamp 100, wherein any pressure held by the pilot-operated check valve is retaining in the volume 120 within a housing 106 of the pin clamp.

According to one example, as illustrated in FIGS. 2A-2C. a first port 202 is provided, wherein the first port is associated with a first axial side 204 of the piston 116. A second port 206 is further provided, wherein the second port is associated with a second axial side 208 of the piston 116. In accordance with the present disclosure, the pilot-operated check valve 200 is provided in fluid communication with one of the first port 202 and second port 206, wherein the check valve is configured to selectively maintain a pneumatic pressure associated with one or more of the respective first axial side 204 and second axial side 208 when a source of pneumatic pressure is removed from one or more of the first port and second port.

For example, the housing 106 comprises one or more passages 210 defined therein, wherein the one or more passages define a pneumatic circuit 212 operably coupling the first port 202, second port 206, and pilot-operated check valve 200. The pilot-operated check valve 200, for example, may be selectively energized and/or de-energized by a selective application of pneumatic pressure to a third port (not shown). Thus, pneumatic pressure that is applied to the pin clamp 100 (e.g., ranging between approximately 60 psi and 120 psi) is retained by the pilot-operated check valve 200. In the present disclosure, the pin clamp 100 is configured to provide a predetermined clamping force via the clamping arm 168 in order clamp down onto a workpiece (e.g., the white body) to maintain a position thereof. In a conventional clamp, when exposed to a catastrophic force, such as a robot accidentally colliding with the workpiece, conventional pin clamps can often be moved. However, as soon as the catastrophic force ends, the conventional pin clamp would go back to its original clamping force.

Since the pin clamp 100 of the present disclosure comprises a pilot-operated check valve 200, once the clamping arm 168 is released by pressure on an opposing port (e.g., the second port 206), the clamp arm disengages the workpiece. The pilot-operated check valve 200, for example, generally maintains the pneumatic pressure in the volume 120, therein generally preventing the piston 116 from translating along the axis 110, whereas in conventional pin clamps, pressure within the clamping cylinder can be compressed (e.g., the piston can move) based on how much force is applied. Alternatively, many complex mechanisms have been conventionally used to lock a clamping arm in place; however, such mechanism are complex and the number of parts and components involved can reach 50 or more parts. Since the mean time before failure (MTBF) is typically halved for each part added, such additional parts and components can decrease the life expectancy of the conventional pin clamp. On the contrary, the present disclosure has very few parts, is relatively straightforward in operation, has a lower cost, and significantly higher reliability than conventional pin clamps.

The pilot-operated check valve 200 of the present disclosure, for example, is integral to the housing 106 of the pin clamp 100. In one example, pneumatic circuitry associated with the pilot-operated check valve 200 is internal to the housing 106, wherein porting is protected within the housing, thus providing additional robustness of the pin clamp 100. In one example, the pilot-operated check valve 200 is provided in the housing 106 and held in place via a circlip 214 illustrated in FIG. 2A. Alternatively, porting associated with the pilot-operated check valve 200 may be drilled or otherwise machined into the housing 106, wherein a ball (not shown) is pressed into the housing to seal any exposed hole(s). Further, porting to a pneumatic source (not shown) may be provided on any side of the housing 106, wherein the pneumatic circuitry may be sealed by a pipe plug (not shown)

Another alternative provides the pilot operated check valve 200 in a valve stack (not shown) external to the pin clamp 100. Preferably, however, the pilot-operated check valve 200 is integral to the housing 106, which may be formed from a solid piece of aluminum.

Figure 10:
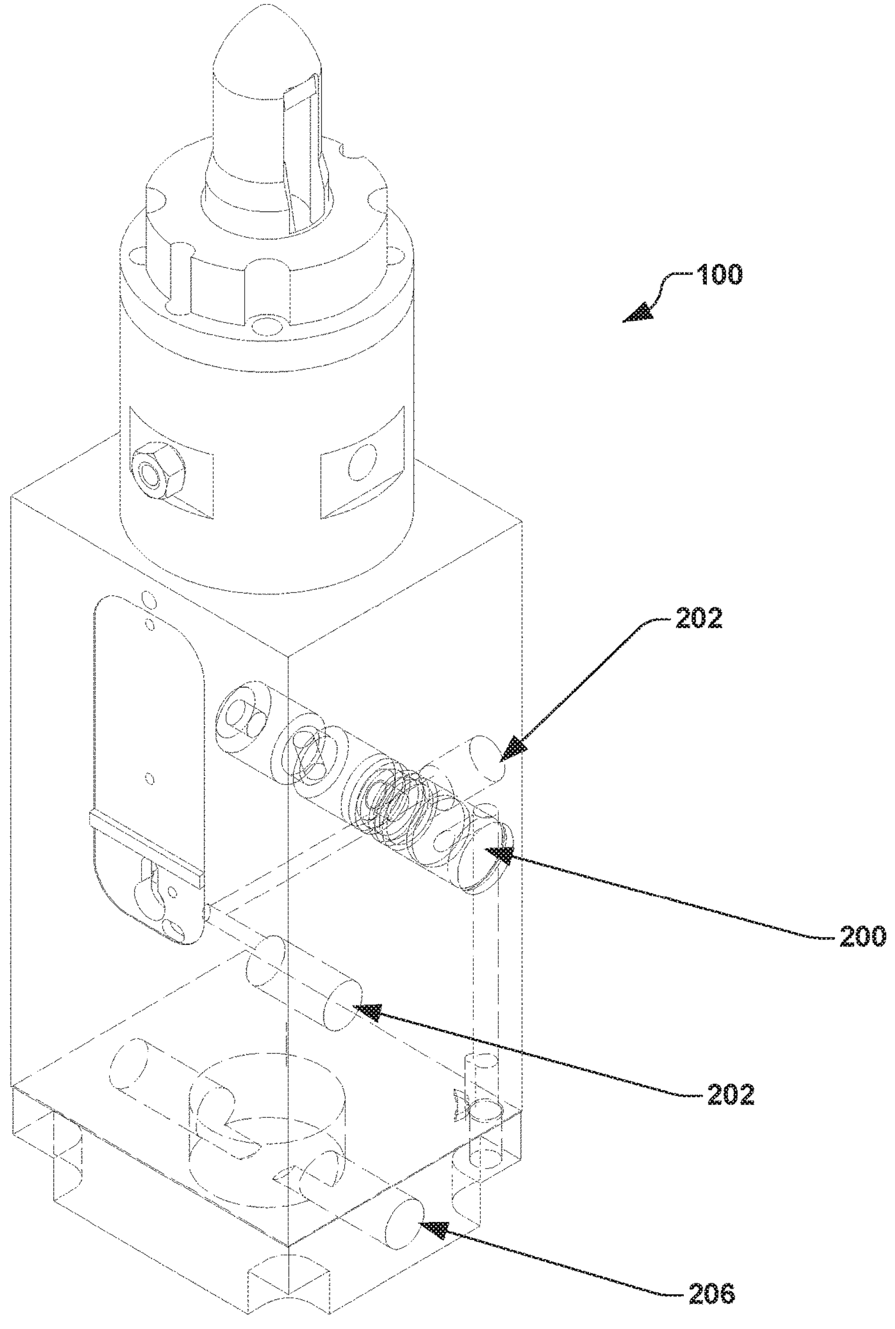
FIG. 10 illustrates an exemplary check valve provided in a clamping mechanism in accordance with another exemplary aspect.

Referring generally to FIGS. 2B and 10, during clamping, the pilot operated check valve provides pneumatic pressure through the first port 202 (e.g., associated with the first axial side 204 of the piston 116) and the pneumatic pressure forces the piston in a direction to clamp the clamping arm 168, whereby the pressure is contained in the volume until another port (e.g., the second port 206) is actuated by pneumatic force. To unclamp, pneumatic pressure is provided to the second port 206, wherein the pneumatic pressure is further directed to a third port (not shown) associated with the pilot-operated check valve 200. The pilot-operated check valve 200 thus disables the checked port, and the air can return. The pilot-operated check valve 200 is generally transparent (e.g., not seen) by the end user, and as such, exposure of any external circuitry is minimized.

Accordingly, the present disclosure provides 90 degrees of rotation for the pin clamp (e.g., North, South, East, and West) without having to remove the housing 106 from a pre-positioned riser. For example, when in the unclamped position 102 of FIG. 1, the position sensor 160 may be removed, thus exposing the axial channel 158 in the housing 106, therein revealing the clevis fastener. By removing the clevis fastener 156, actuator pin 194, and locating pin 140, for example, the clamping direction of the pin clamp 100 may be reversed. For example, by doing so, the pin clamp 100 may be easily changed 180-degrees from position 148A of FIGS. 5A and 6A to position 148C of FIGS. 5C and 6C. Such an operation may be performed quickly (e.g., less than approximately 5 minutes), and without causing deleterious modifications to the existing structure (e.g., a riser) onto which the housing 106 of pin clamp is mounted.

Further, if a 90-degree rotation of the orientation of the position 148 is desired, the present disclosure additionally provides a simple and easy removal of the clevis pin 176 via the above-disclosed selective retaining of the clevis pin 176 and o-ring 182. For example, after removing the clevis fastener 156, actuator pin 194, and locating pin 140, the clevis 126 and clamping arm 168 may be removed from the pin clamp 100 and a screw or any small object may be used to manually push the clevis pin 176 out of the respective radial prong hole 132A, 132B. The o-ring 182 within the radial prong hole 132A, for example, generally holds the clevis pin (e.g., a hardened steel dowel) in place, and the resiliency of the o-ring may be easily overcome by manual pressure. Since most of the forces that are seen by the clevis pin 176 during operation of the pin clamp 100 arise from moving the clamping arm 168 along the axis 110, there are little to no forces acting to move the clevis pin out of the respective radial prong hole 132A, 132B. Therefore, the present disclosure presently appreciates that the clevis pin may be retained by simply counteracting relatively insubstantial forces such as vibration. Conventional clevis assemblies utilize an interference fit, thus typically needing a mechanical press, whereby clevis pins are typically taken to a machine shop or workbench to be pressed in and out. The present disclosure provides for removal and reassembly of the clevis pin 176 with fingertips or other slight pressure. One alternative contemplated in the present disclosure is to utilize a threaded dowel, however, since non-threaded dowels are typically available as standard off-the-shelf parts, the dowel 178 (e.g., having no threads) of the present disclosure is more efficient.

In one example, the pin clamp 100 of the present disclosure may be mounted on a riser affixed to a pallet, and the pin clamp may be subsequently moved any of the four ordinate positions illustrated in FIGS. 5A-5D and 6A-6D. Typically, an orientation of a pin clamp is set and stays in the same direction. However, occasionally, a circumstance may arise, such as during run-off when the making of finished automotive parts is commenced, where it is discovered that the clamping arm 168 is in the wrong orientation or is not able to reach a proper location for clamping. In such a situation, the rotational position of the clamp arm of the present disclosure can be easily and quickly rotated on the fixed riser, as opposed to conventional apparatuses, where the entire riser is often changed or modified, thus requiring accurately repositioning the riser (e.g., precisely spatially relocating the riser with a laser in x, y, and z coordinates). Such a change can cause many problems when a large number of pallets are utilized (e.g., 800-1000 pallets). Conventionally, customized risers are quite expensive, whereby the riser is designed to provide specialized location capabilities. The present disclosure is configured to advantageously utilize a standard riser North American Automotive Manufacturing (NAAM) riser, whereby the housing 106 of the pin clamp 100 of FIGS. 1A, 1B remains attached to the riser on the pallet or fixture, and the housing does not have to be removed to change the direction of clamping by 90 degrees.

Although the invention has been shown and described with respect to a certain embodiment or embodiments, it should be noted that the above-described embodiments serve only as examples for implementations of some embodiments of the present invention, and the application of the present invention is not restricted to these embodiments. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Accordingly, the present invention is not to be limited to the above-described embodiments, but is intended to be limited only by the appended claims and equivalents thereof.

What is claimed:

1. A pin clamp, comprising:

a housing having a bore extending therethrough, therein defining an axis;

a shaft;

a piston operably coupled to the shaft, wherein the piston is in sliding engagement with the bore;

a locating pin;

a clamping arm operably coupled to the shaft and configured to extend and retract with respect to the locating pin; and a check valve associated with the housing, wherein the check valve is configured to selectively maintain a pneumatic pressure associated with one of a first axial side and a second axial side of the piston when a source of pneumatic pressure is removed from the one of the first axial side and second axial side of the piston.

2. The pin clamp of claim 1, wherein the housing comprises:

a first port defined in the housing associated with the first axial side of the piston;

a second port associated with the second axial side of the piston; and one or more passages defined within the housing, wherein the one or more passages define a pneumatic circuit coupling the first port, second port, check valve, and a volume associated with a portion of the bore.

3. The pin clamp of claim 1, wherein the check valve comprises a pilot-operated check valve.

4. The pin clamp of claim 1, wherein the locating pin comprises a plurality of mounting features configured to selectively affix the locating pin to the housing.

5. The pin clamp of claim 1, further comprising a position sensor operably coupled to the housing, wherein the position sensor is configured to determine a position of the clamping arm along the axis.

6. The pin clamp of claim 3, wherein the housing comprises:

a first port defined in the housing and associated with the first axial side of the piston;

a second port defined in the housing and associated with the second axial side of the piston;

a third port defined in the housing and associated with the pilot-operated check valve, wherein the pilot-operated check valve is configured to accept a selective application of pneumatic pressure thereto via the third port, thereby selectively energizing or de-energizing the pilot-operated check valve; and one or more passages defined within the housing, wherein the one or more passages define a pneumatic circuit coupling the first port, second port, third port, pilot-operated check valve, and a volume associated with a portion of the bore.

7. The pin clamp of claim 3, wherein the locating pin has an internal cavity extending axially from a mounting portion thereof and radially through an opening in a sidewall of the locating pin, wherein the mounting portion of the locating pin is configured to be selectively fixedly coupled to the housing.

8. The pin clamp of claim 7, wherein the mounting portion of the locating pin is configured to be selectively coupled to the housing in one of four 90-degree-opposed positions with respect to the shaft and housing.

9. A pin clamp, comprising:

a housing having a bore extending therethrough, therein defining an axis;

a shaft;

a piston operably coupled to the shaft, wherein the piston is in sliding engagement with the bore, wherein the housing comprises a first port associated with a first axial side of the piston and a second port associated with a second axial side of the piston;

a locating pin;

a clamping arm operably coupled to the shaft and configured to extend and retract with respect to the locating pin; and a check valve associated with the housing, wherein the check valve is configured to selectively maintain a pneumatic pressure associated with one of the first axial side and the second axial side of the piston when a source of pneumatic pressure is removed from the one of the first axial side and second axial side of the piston, and wherein one or more passages are further defined within the housing, wherein the one or more passages define a pneumatic circuit coupling the first port, second port, check valve, and a volume associated with a portion of the bore.

10. The pin clamp of claim 9, wherein the mounting portion of the locating pin is configured to be selectively coupled to the housing in one of four 90-degree-opposed positions with respect to the shaft and housing.

11. A pin clamp, comprising:

a housing having a bore extending therethrough, therein defining an axis;

a shaft;

a piston operably coupled to the shaft, wherein the piston is in sliding engagement with the bore;

a locating pin having an internal cavity extending axially from a mounting portion thereof and radially through an opening in a sidewall of the locating pin, wherein the mounting portion of the locating pin is configured to be selectively fixedly coupled to the housing;

a clamping arm operably coupled to the shaft and configured to extend and retract with respect to the locating pin; and a pilot-operated check valve associated with the housing, wherein the pilot-operated check valve is configured to selectively maintain a pneumatic pressure associated with one of a first axial side and a second axial side of the piston when a source of pneumatic pressure is removed from the one of the first axial side and second axial side of the piston, and wherein the pilot-operated check valve is configured to be selectively energized or de-energized by a selective application of pneumatic pressure thereto.

12. The pin clamp of claim 11, wherein the housing comprises:

a first port defined in the housing and associated with the first axial side of the piston;

a second port defined in the housing and associated with the second axial side of the piston;

a third port defined in the housing and associated with the pilot-operated check valve, wherein the pilot-operated check valve is configured to accept a selective application of pneumatic pressure thereto via the third port, thereby selectively energizing or de-energizing the pilot-operated check valve; and one or more passages defined within the housing, wherein the one or more passages define a pneumatic circuit coupling the first port, second port, third port, pilot-operated check valve, and a volume associated with a portion of the bore.

13. The pin clamp of claim 11, wherein the mounting portion of the locating pin is configured to be selectively coupled to the housing in one of four 90-degree-opposed positions with respect to the shaft and housing.

14. The pin clamp of claim 11, wherein the pilot-operated check valve is provided in a valve stack external to the pin clamp.

* * * * *